Aug. 3, 1926.
C. DAY
1,594,498
MEANS FOR USE IN SINKING TUBE WELLS
Original Filed Oct. 4, 1924
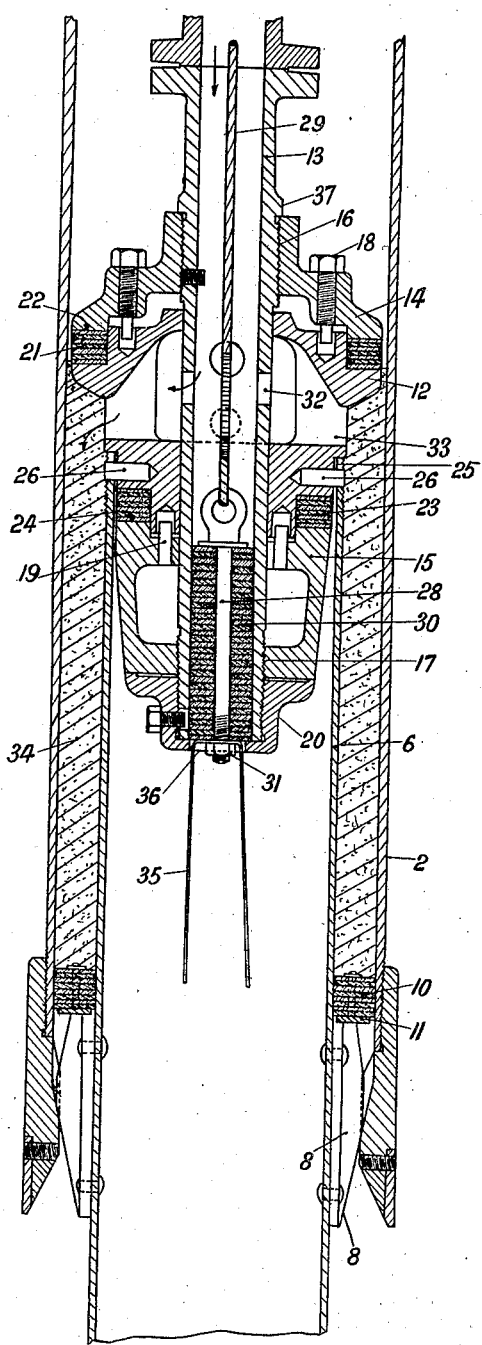
Inventor
Charles Day
By
Pennie, Davis, ... ...
Attorneys Patented Aug. 3, 1926.

1,594,498

UNITED STATES PATENT OFFICE.

CHARLES DAY, OF GLASGOW, SCOTLAND.

MEANS FOR USE IN SINKING TUBE WELLS.

Original application filed October 4, 1924, Serial No. 741,672. Divided and this application filed January 28, 1926. Serial No. 84,293.

This invention relates to improvements in tools or plugs used in effecting a joint between two coaxial tubes of different diameters to be joined in overlapping relation below ground level in sinking a tube well.

As is understood, to effect a tight joint, the annular space between the overlapping end portions of the two tubes is filled with cement grout or the like, or with other sealing material.

The improved joint-forming tool of the invention comprises a plug mounted on a central tube adapted to be lowered into position to engage and seal off the top of the tube of smaller diameter as also the tube of larger diameter above the annular space formed by the overlapping of the two tubes, and formed to permit cement grout or other sealing material to pass through the central tube to fill the said annular space without entering the tube of smaller diameter.

For effecting fluid-tight contact with the interior surfaces of the tubes, the plug is provided with rings of rubber or other suitable material adapted to be expanded laterally and radially by pressure applied thereto parallel to the axis of the tube well.

The figure of the accompanying drawing is a longitudinal section showing the joint with the plug in position for grouting the joint.

In the drawing 2 denotes the sinking tube or outer casing and 6 the rising tube from the strainer.

To stop the entry of sand which might rise up between the overlap of the two tubes, the space between them is filled with Portland cement grout, or other medium.

In filling the annular space provision is made for blocking the flow of grout both upwards and downwards, and confining it as far as possible to the annular space between the overlapping parts of the tubes.

An annular rubber packing 10 may be inserted from above and caused to take up a position resting on top of lugs, 8, 8 in the annular space between the overlapping parts of the tubes 2 and 6. If preferred, this rubber packing ring may be fitted or fixed to the tube 6, or to either tube, in its desired position before the pipe is lowered in position.

Preferably a metal ring or washer 11 giving suitable clearances is first placed upon the tops of the lugs 8 so as to give sufficient support to the rubber packing 10.

Referring now more particularly to the device of the invention, for blocking the annular space on top there is used a tool or plug comprising a central part 12 which is mounted on a central tube or hollow shaft 13 so that it can freely rotate on the latter. An upper sleeve 14 and a lower sleeve 15 are also mounted on the tube 13, engaging, respectively, a right-handed and a left-handed screw-thread 16 and 17 on the exterior of the tube 13. Means such as studs 18 or pins 19 may be provided which enter sockets in the part 12, preventing the two sleeves 14 and 15 from rotating relatively to the part 12. A cup 20 holds the parts together. Rubber ring or other suitable packings 21 are inserted in a depression or gland 22 between the parts 12 and 14, these rings being adapted upon compression to expand laterally and radially and to form a fluid-tight contact between the plug and the inner surface of the tube 2. Other rubber rings 23 inserted in a depression or gland space 24 between the parts 12 and 15 are adapted upon compression to expand laterally and radially and to form a fluid-tight contact between the plug and the inner surface of the tube 6.

The upper edge of the inner tube 6 is provided with slots 25 adapted to be engaged by projections or pins 26 fixed to the part 12. The parts 15 and 20 of the plug may be coned to permit the plug to enter freely the upper part of the tube 6.

The tube 13 is fixed to a hollow down pipe by which it may be rotated and through which cement grout may be poured.

An eye-bolt 28 is suspended by a wire or the like 29 inside the bottom of the tube 13. On this bolt are strung rubber washers 30 which may be expanded laterally and radially by tightening up the nut 31 to engage the interior of the tube 13 and form a fluid-tight joint therewith.

The tube 13 has perforations 32 for grout or the like to pass through and to find its way through passages 33 to the annular space 34 between the overlapping portions of the two tubes 2 and 6 to be joined.

The stopper constituted by the washers 30 is of such length that when resting on the edge of the cup 20 its upper end does not cover the holes 32 in the tube 13.

A spring 35 attached to the stopper 30 may pass through a hole 36 in the cup 20 and the shape and length of this spring and the hole in the cap may be so arranged that if the stopper 30 is drawn up by pulling on the cord 29 this spring will be drawn through the hole and will spring outwards and engage the interior upper surface of the cup when the stopper 30 is sealing off the holes 32.

In action, the two tubes 2 and 6 being in their desired relative positions and the washer 10 being in position, the plug is lowered until it enters the top of the tube 6. It is then slightly rotated until the pins or the like 26 drop into the slots 25 in the top of the tube 6 which will prevent further rotation of the central part 12 of the plug relatively to the tube 6. This action also prevents rotation of the sleeves 14 and 15. The tube 13 is then rotated further to cause the sleeves 14 and 15 to approach each other. This action may be due to the right and left hand threads on the said sleeves and the corresponding threads 16 and 17 on the tube 13. Or, if preferred, one sleeve, preferably the upper sleeve 14, may merely be pressed against a collar 37 by the movement of the other sleeve towards it. In either case the action is such that the rubber rings 21 and 23 are expanded to make fluid-tight joints with the two tubes 2 and 6 and to isolate the annular space to receive grout.

Grout is now poured in to fill this space and the rubber stopper 30 may then be partly withdrawn to close off the perforations 32 and to prevent any leakage of grout as the tool is being withdrawn.

What I claim is:—

1. For forming a joint in a tube well comprising two coaxial tubes of different diameters entering one within the other with end portions overlapping, a tube disposed centrally in relation to said coaxial tubes and penetrating the tube of smaller diameter, and a plug mounted on said centrally disposed tube adapted to engage and seal off the overlapped end of the tube of smaller diameter, said plug and said centrally disposed tube being formed to permit passage of sealing medium to the annular space between the overlapping portions of said tubes of different diameters while excluding passage of sealing medium into the tube of smaller diameter.

2. For forming a joint in a tube well comprising two coaxial tubes of different diameters entering one within the other with end portions overlapping, a tube disposed centrally in relation to said two coaxial tubes, a plug mounted on said centrally disposed tube adapted to be inserted into the tube of smaller diameter, said plug and said centrally disposed tube being formed to permit passage of sealing medium to the annular space between the overlapping portions of said tubes of different diameters, compressible packing applied to the said plug for sealing off the overlapped end of the tube of smaller diameter, compressible packing applied to the said plug for sealing off the tube of larger diameter beyond the annular space between the overlapped portions of the coaxial tubes, and means for effecting compression of the packing.

In testimony whereof I have signed my name to this specification.

CHARLES DAY.